(12) United States Patent
Rettig et al.

(10) Patent No.: US 10,044,848 B2
(45) Date of Patent: Aug. 7, 2018

(54) NATURAL LANGUAGE USER INTERFACE

(71) Applicant: Schlage Lock Company LLC, Indianapolis, IN (US)

(72) Inventors: Raymond F. Rettig, Fishers, IN (US); Michelle Vickrey, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 14/728,365

(22) Filed: Jun. 2, 2015

(65) Prior Publication Data

US 2015/0350405 A1    Dec. 3, 2015

Related U.S. Application Data

(60) Provisional application No. 62/006,751, filed on Jun. 2, 2014.

(51) Int. Cl.
| | |
|---|---|
| *H04M 11/04* | (2006.01) |
| *H04M 1/725* | (2006.01) |
| *H04W 12/06* | (2009.01) |
| *H04W 76/14* | (2018.01) |
| *H04W 76/50* | (2018.01) |
| *H04W 4/80* | (2018.01) |

(Continued)

(52) U.S. Cl.
CPC ........ *H04M 1/72533* (2013.01); *G06F 21/32* (2013.01); *G07C 9/00071* (2013.01); *G07C 9/00563* (2013.01); *H04W 4/80* (2018.02); *H04W 12/06* (2013.01); *H04W 76/14* (2018.02); *H04W 76/50* (2018.02); *G07C 9/00309* (2013.01); *G07C 2009/00801* (2013.01); *H04M 1/7253* (2013.01); *H04M 2250/02* (2013.01); *H04M 2250/74* (2013.01)

(58) Field of Classification Search
CPC .............................. H04W 76/50; H04W 76/14
USPC ................ 455/404.1, 410, 411, 414.2, 569.2
See application file for complete search history.

(56) References Cited

U.S. PATENT DOCUMENTS

| | | | |
|---|---|---|---|
| 2003/0231550 A1* | 12/2003 | Macfarlane | B60R 25/257 367/198 |
| 2004/0143437 A1* | 7/2004 | Hanood | B60R 25/2009 704/258 |
| 2004/0222899 A1 | 11/2004 | Yezersky et al. | |

(Continued)

OTHER PUBLICATIONS

International Search Report; US Patent and Trademark Office; International Application No. PCT/US2015/033836; dated Aug. 25, 2015; 2 pages.

(Continued)

*Primary Examiner* — Chuck Huynh
(74) *Attorney, Agent, or Firm* — Taft Stettinius & Hollister LLP

(57) ABSTRACT

A mobile device is configured to wirelessly authenticate with a reader device. The mobile device may receive an acoustic signal from a user, and a command may be determined based on the acoustic signal. The mobile device may transmit the command to the reader device if the mobile device and the reader device are authenticated. The reader device may receive the command, and may analyze the command to determine an action to be performed. The reader device may then perform the action if the mobile device is authorized to request the command to be performed.

18 Claims, 3 Drawing Sheets

(51) Int. Cl.
*G06F 21/32* (2013.01)
*G07C 9/00* (2006.01)

(56) References Cited

U.S. PATENT DOCUMENTS

| | | | |
|---|---|---|---|
| 2007/0216764 A1* | 9/2007 | Kwak | H04L 12/64 |
| | | | 348/14.06 |
| 2010/0201482 A1 | 8/2010 | Robertson et al. | |
| 2011/0060480 A1 | 3/2011 | Mottla et al. | |
| 2011/0201300 A1 | 8/2011 | Ornstein | |
| 2012/0019379 A1* | 1/2012 | Ben Ayed | G08B 13/1436 |
| | | | 340/539.1 |
| 2013/0157573 A1* | 6/2013 | Aldaz | H04W 4/008 |
| | | | 455/41.2 |
| 2014/0049364 A1 | 2/2014 | Ahearn et al. | |
| 2014/0136195 A1 | 5/2014 | Abdossalami et al. | |
| 2014/0222436 A1* | 8/2014 | Binder | G06F 3/167 |
| | | | 704/275 |
| 2015/0161370 A1 | 6/2015 | North et al. | |

OTHER PUBLICATIONS

Written Opinion of the International Searching Authority; US Patent and Trademark Office; International Application No. PCT/US2015/033836; dated Aug. 25, 2015; 4 pages.
New Zealand First Examination Report; New Zealand Intellectual Property Office; New Zealand Application No. 727976; dated May 19, 2017; 7 pages.
Canadian Office Action; Canadian Intellectual Property Office; Canadian Patent Application No. 2,956,070; dated Aug. 10, 2017; 4 pages.
New Zealand Second Examination Report; New Zealand Intellectual Property Office; New Zealand Application No. 727976; dated Jan. 19, 2018; 6 pages.
Australian First Examination Report; Australian Intellectual Property Office; Australian Application No. 2015271796; dated Sep. 19, 2017; 4 pages.
Supplementary Partial European Search Report; European Patent Office; European Application No. 15802644.3; dated Apr. 23, 2018; 14 pages.

* cited by examiner

NATURAL LANGUAGE USER INTERFACE

CROSS REFERENCE TO RELATED APPLICATIONS

The present application claims the benefit of U.S. Provisional Patent Application No. 62/006,751 filed on Jun. 2, 2014, the contents of which are hereby incorporated by reference in their entirety.

TECHNICAL FIELD

The present invention generally relates to a user interface for an electronic system, and more particularly, but not exclusively, relates to an identification or authorization interface for an access control system.

BACKGROUND

Electronic systems often include a user interface through which a user can communicate with the system. For example, in electronic access control systems, a user interface is commonly used to identify a user, and the access control system allows access if the user is determined to be an authorized user. For example, certain conventional user interfaces include a keypad or a credential reader. These systems may have certain limitations including, for example, the amount of time it takes for the user to operate the interface. Therefore, a need remains for further improvements in systems and methods for interfacing with electronic systems.

BRIEF DESCRIPTION OF THE FIGURES

The description herein makes reference to the accompanying figures wherein like reference numerals refer to like parts throughout the several views, and wherein.

DETAILED DESCRIPTION OF ILLUSTRATIVE EMBODIMENTS

Figure 1:
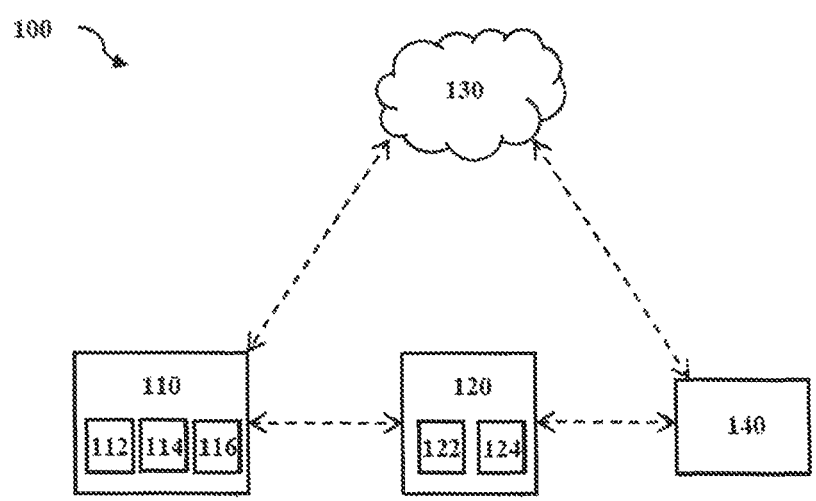
FIG. 1 is a schematic illustration of an exemplary system according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, illustrated therein is a system 100 according to one embodiment. The system 100 generally includes a mobile device 110 in wireless communication with a reader device 120, and may further include a server 130 and/or a processing system 140 in communication with the mobile device 110, the reader device 120, and/or one another. In the embodiment shown in FIG. 1, the system 100 is configured as an access control system, although it is also contemplated that the system 100 may be directed to a payment system, a transit system, or other types of control systems.

As described in further detail below, the mobile device 110 is operable to receive an acoustic signal such as, for example, a spoken command, and to transmit to the reader device 120 data relating to the signal or command. The reader device 120 is configured to receive the data and to perform one or more actions in response thereto. In certain forms, the reader device 120 may perform the actions only if the mobile device 110 has previously been authenticated such as, for example, in an initial set-up operation. In the illustrated system 100, the reader device 120 is integral to or associated with an electronic lock, and at least some of the actions performed may include causing the electronic lock to lock or unlock.

The mobile device 110 includes a transceiver 112 that allows the mobile device 110 to communicate data with another device such as, for example, the reader device 120. In the embodiment shown in FIG. 1, the mobile device 110 is a mobile phone such as, for example, a smartphone. In some embodiments, the transceiver 112 is provided with Bluetooth or Bluetooth Low Energy (BLE) capabilities. However, it is contemplated that the transceiver 112 may utilize a different communication protocol such as, for example, near field communication (NFC), Wi-Fi (e.g., Wi-Fi Direct), and/or any other appropriate communication protocol known to those skilled in the art. In other embodiments, the transceiver 112 may also be provided with GPS capabilities, or the mobile device 110 may be provided with a separate element that provides GPS capabilities. It is also contemplated that the mobile device 110 may include more than one transceiver 112. Furthermore, in some embodiments, the transceiver 112 is a passive device, while in other embodiments the transceiver 112 is an active device.

The mobile device 110 may also include an acoustic input such as, for example, a microphone 114 operable to issue signals to other elements of the mobile device in response to an acoustic signal such as a command spoken by a user. The mobile device 110 may also include one or more applications 116 that process data related to acoustic signals such as, for example, data received from the microphone 114. The application 116 may further process data relating to a credential that allows the mobile device 110 to operate one or more electronic locks which may be associated with the reader device 120. It is contemplated that the application 116 may include more than one application to carry out the various operations described in the present application.

The mobile device 110 may be configured to send (for example, using the transceiver 112 and the application 116) secure data to the reader device 120, and the reader device 120 may be configured to verify the secure data. In some embodiments, the reader device 120 is also configured to send the secure data, if verified, to the processing system 140. The processing system 140 may include a control panel, or any other control system or panel that uses a credential or unique identifier. For example, the processing system 140 may process the secure data to determine whether a user of the mobile device 110 should be allowed access to an access-restricted area. However, in some embodiments, the reader device 120 may perform the analysis and make the decisions that may otherwise be handled by the processing system 140.

In some embodiments, the processing system 140 may include a network bridge that communicates with wireless devices (not shown) for controlling and/or monitoring items in a residential home. The network bridge may receive information from the reader device 120 and cause a wireless device to perform an action based on the information. The network bridge may also report information to the server 130 and/or receive commands from the server 130.

The reader device 120 is configured to communicate with the mobile device 110 to receive a credential, secure data, location information, data relating to a spoken command, and/or any other useful information for processing, and to perform functions based at least in part upon the information received from the mobile device 110. The reader device 120 may include a transceiver 122 that allows the mobile device 110 and the reader device 120 to wirelessly communicate with one another. In some embodiments, the transceiver 122 is a Bluetooth transceiver that allows the mobile device 110 and the reader device 120 to communicate via a Bluetooth connection. It is also contemplated that the Bluetooth connection may be a Bluetooth low energy (BLE) connection.

When in communication with the reader device 120, the mobile device 110 may communicate data so that the reader device 120 can make one or more decisions based on the data. The mobile device 110 may be in direct communication with the reader device 120, or the communication may be routed to the reader device 120 through one or more intermediate devices such as, for example, the server 130 and/or the processing system 140. Furthermore, the decisions may be made locally by the reader device 120, or by another device which has access to the data. For example, the decisions may be made by one or more of the mobile device 110, the server 130, and/or the processing system 140. It is also contemplated that the server 130 may provide a cloud service such as, for example, a cloud-based intelligent home system that allows a user to control, interact with, and/or monitor devices in a residential home via the server 130.

Figure 2:
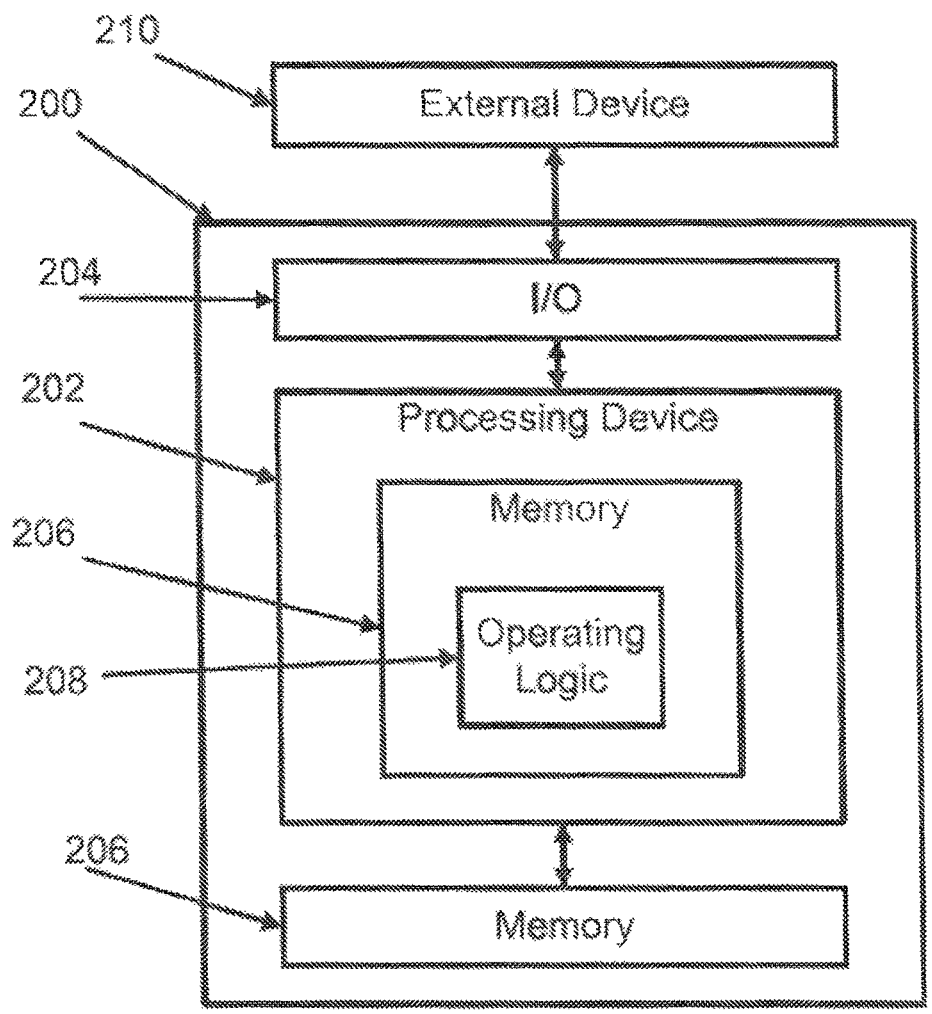
FIG. 2 is a schematic block diagram of an exemplary computing device.

FIG. 2 is a schematic block diagram of a computing device 200. The computing device 200 is one example of a computer, server, mobile device, reader device, or equipment configuration which may be utilized in connection with the mobile device 110, reader device 120, server 130, and/or processing system 140 shown in FIG. 1. The computing device 200 includes a processing device 202, an input/output device 204, memory 206, and operating logic 208. Furthermore, the computing device 200 communicates with one or more external devices 210.

The input/output device 204 allows the computing device 200 to communicate with the external device 210. For example, the input/output device 204 may be a network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computing device 200. For example, the external device 210 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

The processing device 202 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 202 with multiple processing units, distributed, pipelined, and/or parallel processing can be utilized as appropriate. The processing device 202 may be dedicated to performance of just the operations described herein or may be utilized in one or more additional applications. In the depicted form, the processing device 202 is of a programmable variety that executes algorithms and processes data in accordance with operating logic 208 as defined by programming instructions (such as software or firmware) stored in memory 206. Alternatively or additionally, the operating logic 208 for processing device 202 is at least partially defined by hardwired logic or other hardware. The processing device 202 can be comprised of one or more components of any type suitable to process the signals received from input/output device 204 or elsewhere, and provide desired output signals. Such components may include digital circuitry, analog circuitry, or a combination of both.

The memory 206 may be of one or more types, such as a solid-state variety, electromagnetic variety, optical variety, or a combination of these forms. Furthermore, the memory 206 can be volatile, nonvolatile, or a combination of these types, and some or all of memory 206 can be of a portable variety, such as a disk, tape, memory stick, cartridge, or the like. In addition, the memory 206 can store data that is manipulated by the operating logic 208 of the processing device 202, such as data representative of signals received from and/or sent to the input/output device 204 in addition to or in lieu of storing programming instructions defining the operating logic 208, just to name one example. As shown in FIG. 2, the memory 206 may be included with the processing device 202 and/or coupled to the processing device 202.

The processes in the present application may be implemented in the operating logic 208 as operations by software, hardware, artificial intelligence, fuzzy logic, or any combination thereof, or at least partially performed by a user or operator. In certain embodiments, modules represent software elements as a computer program encoded on a computer readable medium, wherein the mobile device 110, reader device 120, server 130, and/or processing system 140 performs the described operations when executing the computer program.

Figure 3:
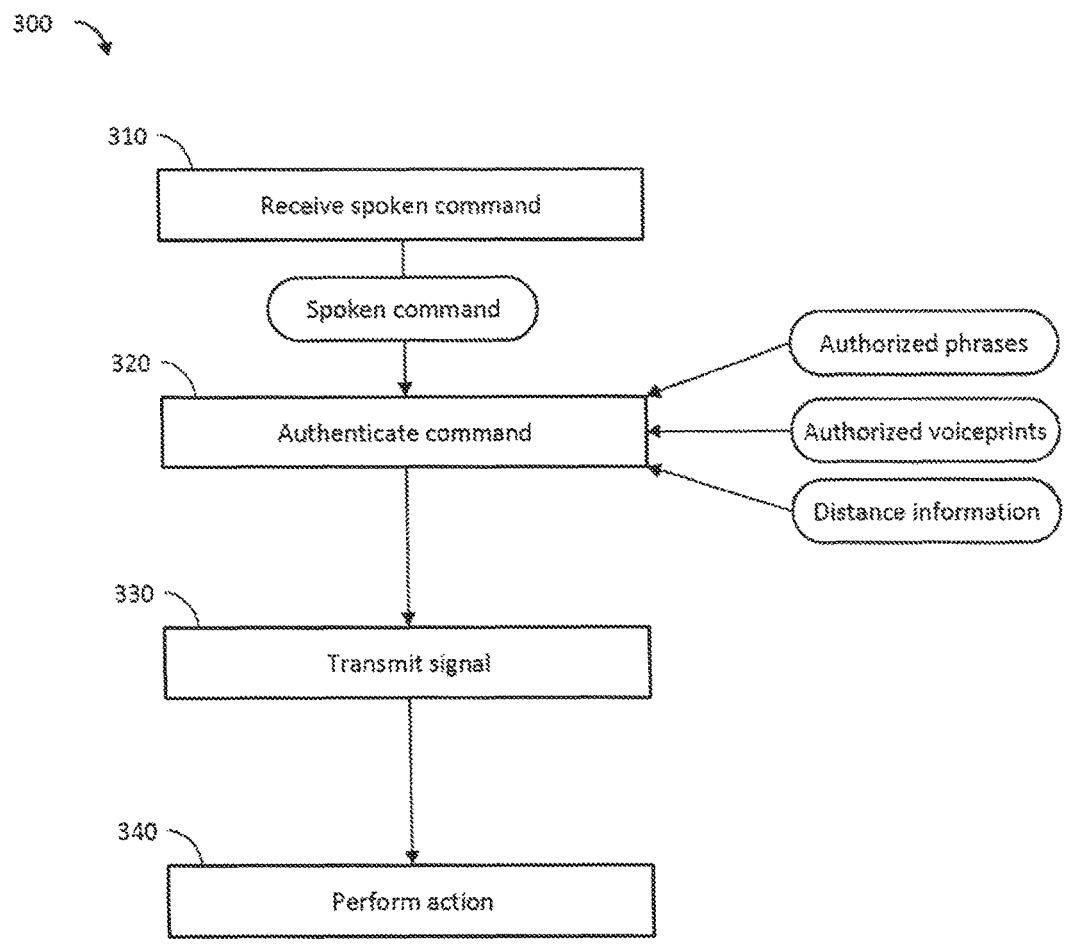
FIG. 3 is a schematic flow chart of an exemplary process according to one embodiment.

With reference to FIG. 3, an exemplary process 300 which may be performed using the access control system 100 is illustrated therein. Operations illustrated for the processes in the present application are understood to be exemplary only, and operations may be combined or divided, and added or removed, as well as re-ordered in whole or in part, unless explicitly stated to the contrary. Unless specified to the contrary, it is contemplated that certain operations or steps performed in the process 300 may be performed wholly by the mobile device 110, the reader device 120, the server 130, and/or the processing system 140, or that the operations or steps may be distributed among one or more of the elements and/or additional devices or systems which are not specifically illustrated in FIGS. 1 and 2.

FIG. 3 illustrates a schematic flow diagram of the exemplary process 300, which generally includes receiving a command spoken by a user, authenticating the command, transmitting a signal relating to the command, and performing an action based at least in part upon the signal.

The illustrative process 300 begins with an operation 310 which includes receiving a spoken command from a user, for example with the microphone 114. The microphone 114 may then issue signals relating to the spoken command to the application 116. In certain forms, the mobile device 110 may be operable to perform the operation 310 while in a low-power or locked state such that the user has only to speak the phrase, and need not manually engage the mobile device 110 prior to speaking the command. For example, the microphone 114 and the application 116 may remain operable when the mobile device 110 is not actively being used. In other forms, the microphone 114 and the application 116 may normally be deactivated when the mobile device 110 is in a low-power or locked mode, and may be activated by a background service in response to the mobile device transceiver 112 detecting or pairing with the reader device transceiver 122. In either of these cases, the mobile device 110 may remain in the user's pocket or purse when the command is spoken, thereby increasing ease of use.

The process 300 may then proceed to an operation 320 which includes analyzing the signals from the microphone 114, and determining whether the spoken command is an authorized command. The operation 320 may include comparing the spoken phrase in the command to a set of authorized phrases, and determining whether the spoken phrase corresponds to any of the authorized phrases. For example, if "unlock" is an authorized phrase and "open door" is the spoken phrase, the operation 320 may include determining that the spoken command is not an authorized command. The set of authorized phrases may be pre-programmed into the application 116, or one or more of the phrases may be customizable by the user.

The operation 320 may further include comparing a voiceprint of the spoken command to one or more authorized voiceprints, and determining whether the voiceprint of the spoken command corresponds to an authorized voiceprint. For example, if an unauthorized user obtains the mobile device 110 and speaks an authorized phrase, the voiceprint of the spoken command will not correspond to the authorized voiceprint. As such, the operation 320 may result in determining that the spoken command is not an authorized command, despite the fact that the spoken phrase is an authorized phrase.

In certain forms, the operation 320 may include determining a distance between the mobile device 110 and another object such as, for example, as the reader 120 or a door associated with the access control system 100. Such a determining may be implemented using GPS, received signal strength indication (RSSI) related, for example, to Bluetooth or BLE signal strength, and/or any other suitable technology for determining position. For example, the authenticating in the operation 320 may include requiring that the mobile device 110 be within a predetermined authorized radius of the reader device, and commands spoken outside of the authorized radius may be determined to be unauthorized.

The process 300 may then continue to an operation 330 which includes transmitting, for example, with the transceiver 112, signals related to the authorized command. For example, the operation 330 may include transmitting a first signal in response to a first authorized command, and transmitting a second signal in response to a second authorized command. In the illustrated embodiment, the signals are received by the reader device 120 at the transceiver 122. It is also contemplated that the mobile device 110 may issue the signals to another element such as, for example, the server 130 or the processing system 140, which may in turn relay the signals to the reader device 120.

The process 300 may then continue to an operation 340 which includes performing an action based at least in part upon the signals transmitted in the operation 330. For example, the operation 340 may include performing a first action (such as, for example, unlocking a door) in response to the first signal, and performing a second action (such as, for example, locking the door) in response to a second signal.

In certain embodiments, the system 100 may be configured to recognize a plurality of commands, and perform a distinct action for each of the commands. In certain forms, one or more of the actions may include locking or unlocking a particular door in response to an appropriate command. For example, an authorized spoken command may include one of the phrases "unlock front door" and "unlock patio door", and the system 100 may unlock the corresponding door in response to the command.

In certain forms, the process 300 may include contacting the police in response to a command which indicates that the user is in danger such as, for example, by an intruder. In certain circumstances, the user may not be at risk of immediate harm, and alerting the intruder that the police have been contacted may place the user at a greater risk of harm. In such cases, the user may speak a duress command which is similar to a standard command, and in response, the system 100 may perform a duress action which is not detectable to the intruder. For example, if the standard unlock command is the phrase "unlock", a duress unlock command may be the phrase "unlock the door". The system 100 may merely unlock the door in response to the standard unlock command, and unlock the door and trigger a silent alarm (such as a 911 call from the mobile device 110) in response to the duress unlock command.

In other circumstances, the user may be at risk of immediate harm, and alerting the intruder that the police have been contacted may be more likely to scare off the intruder. In such cases, the user may speak a distress command (i.e., the phrase "help"), and the system 100 may make the 911 call and/or sound an audible alarm in response to the distress command. For example, if the user opens the door to a stranger who then forces his way into the home, the user may speak the distress command, and the system 100 may then perform the distress action in response. In order to prevent inadvertently triggering the distress action, the process 300 may include authenticating the distress command (such as, for example, by comparing the location of the mobile device 110 to the door as described above with respect to the operation 320) prior to performing the distress action.

As can be seen from the foregoing, the system 100 and the process 300 may be utilized to cause the mobile device 110 to receive a spoken command from a user, and to communicate the command to the reader device 120. In response, the reader device 120 may execute an action such as, for example, locking or unlocking an electronic lock. The spoken command may be a phrase including one or more words chosen by the user. Commonly used commands such as "open", "unlock" and "abracadabra" may be used. In certain embodiments, the mobile device 110 may be operable to receive the spoken command and issue the signals relating thereto without physical manipulation. In such forms, the user can speak the command without removing the mobile device 110 from their pocket, thereby providing hands-free operation of the lock. The mobile device 110 may also be operable to ignore commands from an unrecognized voice. For example, if an unauthorized user speaks an unlock command, the mobile device 110 may refuse to send the command to the reader device 120 upon determining that the voice is not one of an authorized user.

The reader device 120 may be configured to accept one or more commands, and to perform a distinct action in response to each command. An illustrative action is a duress unlock action in which the system 100 transmits a signal to authorities indicating someone is forcing the user to unlock the door and gain entry to the house. Commands may be associated with specific doors in the area such that the reader device 120 locks or unlocks the doors associated with the command. The command may be used along with information relating to the distance between the mobile device 110 and the door. For example, commands may be enabled if the user is within one (1) meter of the lock, and commands spoken outside of this distance may be ignored.

While the illustrated system 100 has been described as a physical access control system, it is also contemplated that the system 100 may be utilized to control another form of access. For example, if a computer requires a password, the reader device 120 may be associated with the computer. The mobile device 110 may be authenticated to the computer, and thereafter a spoken unlock computer command may cause the reader device 120 to unlock the computer and bypass the password screen.

The system 100 uses an object that many people already carry with them such as, for example, the mobile device 110 which is used as a conduit to easily and securely gain access to a normally locked door. In an illustrative embodiment, a person walking toward a door speaks a command such as "unlock", which the mobile device 110 receives, authenticates, and communicates to the reader device 120. In response, the reader device 120 commands the electronic lock to unlock. This provides ease of use in that the only thing the user is required to do is speak a command. This additionally provides a higher degree of security in that the mobile device 110 has been authenticated to the lock, and may, in certain embodiments, respond only to the voice of an authorized user.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method, comprising:
   wirelessly authenticating a mobile device with an electronic lock of a door;
   receiving, with the mobile device, an acoustic signal from a user while the mobile device is in a low-power state;
   analyzing the acoustic signal while the mobile device is in the low-power state to (i) determine whether the acoustic signal corresponds with an authorized command based on a set of authorized commands, (ii) determine whether a voiceprint generated from the acoustic signal corresponds with an authorized user based on a set of authorized voiceprints, and (iii) determine whether a physical distance between the mobile device and the electronic lock is less than a maximum authorized distance;
   transmitting the authorized command wirelessly from the mobile device to the electronic lock in response to (i) a determination that the acoustic signal corresponds with an authorized command of an authorized user, (ii) a determination that the voiceprint generated from the acoustic signal corresponds with an authorized voiceprint of an authorized user, and (iii) a determination that the physical distance between the mobile device and the electronic lock is less than the maximum authorized distance;
   receiving the authorized command at the electronic lock;
   processing, with the electronic lock, the command to determine an action to be performed by the electronic lock; and
   performing the action by the electronic lock if the mobile device is authorized to request the command to be performed.

2. The method of claim 1, wherein the electronic lock and the mobile device communicate via Bluetooth communication.

3. The method of claim 1, wherein the command is "Unlock"; and
   wherein the action includes the electronic lock unlocking a latch mechanism.

4. The method of claim 1, wherein the mobile device directly transmits the command to the electronic lock.

5. The method of claim 1, wherein the mobile device transmits the command to a remote server; and
   wherein the remote server transmits the command to the electronic lock.

6. The method of claim 1, wherein if the command is "Help", the mobile device transmits a signal to notify authorities of an emergency.

7. The method of claim 1, wherein the analyzing step further includes transmitting the acoustic signal from the mobile device to a remote server to determine the command.

8. The method of claim 7, further comprising:
   transmitting the command from the remote server to a network bridge at a residence; and
   wirelessly transmitting the command from the network bridge to the electronic lock.

9. The method of claim 8, further comprising:
   transmitting a second command from the network device to another wireless device at the residence in response to the acoustic signal being received at the mobile device.

10. The method of claim 1, wherein determining the physical distance comprises determining the physical distance based on a Bluetooth signal strength of a signal received by the mobile device from the electronic lock.

11. The method of claim 1, further comprising automatically waking the mobile device from a low-power state using a background service in response to detecting a transceiver of the electronic lock.

12. The method of claim 11, wherein the maximum authorized distance is less than a maximum detection distance of the transceiver of the electronic lock.

13. A mobile phone for a user to request a reader device to execute a command based on a spoken command provided by the user, comprising:
   at least one processor; and
   a memory coupled with the processor, the memory including instructions that, when executed by the processor cause the processor to:
      wirelessly authenticate the mobile phone with a reader device,
      analyze the acoustic signal to determine a command that the user requests to be executed by the reader device based on a spoken command from the user, wherein the command is an action that the user requests the reader to perform,
      determine whether the spoken command corresponds to an authorized phrase included in a set of authorized phrases to authenticate the spoken command, wherein the spoken command is authenticated when the spoken command matches the authorized phrase included in the set of authorized phrases; and
   a transceiver configured to:
      receive an acoustic signal from the user, wherein the acoustic signal transports a spoken command from the user to the mobile phone, and
      transmit the command wirelessly from the mobile phone to the reader device for the reader device to execute the command for the spoken command provided by the user when the spoken command is authenticated and the mobile phone is authorized to request the command to be performed by the reader device.

14. The mobile phone of claim 13, wherein the reader device and the mobile phone communicate via Bluetooth communication.

15. The mobile phone of claim 13, wherein the reader device is an electronic door lock.

16. The mobile phone of claim 13, wherein the mobile phone is a smartphone.

17. The mobile phone of claim 13, wherein the mobile phone is configured to transmit the command to the remote server; and
   wherein the remote server is configured to transmit the command to the reader device.

18. A method, comprising:
   wirelessly authenticating a smartphone with a reader device electrically coupled to an electronic lock of a door of a residence;
   receiving, with the smartphone, an acoustic signal from a user, wherein the acoustic signal transports a spoken command from the user to the smartphone;
   determining, with the smartphone, a physical distance between the smartphone and the reader device based on a Bluetooth signal strength of a signal received by the smartphone from the reader device;
   determining, with the smartphone, whether the physical distance between the smartphone and the reader device is less than a maximum authorized distance, wherein the maximum authorized distance is a predetermined authorized radius of a position of the smartphone from the reader device where the spoken commands generated outside of the predetermined authorized radius are determined to be unauthorized;
   analyzing, with the smartphone, the acoustic signal to determine whether the acoustic signal corresponds with a command based on the spoken command from the user and whether the spoken commands are authorized based on whether the smartphone is positioned within the maximum authorized distance between the smartphone and the reader device;
   transmitting the command wirelessly from the smartphone to the reader device for the reader device to execute the command for the spoken command over a Bluetooth communication link in response to a determination that the acoustic signal corresponds with a command based on the spoken command and a determination that the physical distance is less than the maximum authorized distance;
   receiving the command at the reader device;
   processing, with the reader device, the command to determine an action to be performed by the electronic lock; and
   performing the action by the electronic lock if the smartphone device is authorized to request the command to be performed.

* * * * *